(No Model.) 2 Sheets—Sheet 1.

E. McGOVNEY.
HORSE HAY RAKE.

No. 394,198. Patented Dec. 11, 1888.

Witnesses.
W. J. Hutchins.
K. C. Hutchins.

Inventor.
Edward McGovney.
By Thos. H. Hutchins.
Atty.

(No Model.) 2 Sheets—Sheet 2.

E. McGOVNEY.
HORSE HAY RAKE.

No. 394,198. Patented Dec. 11, 1888.

Witnesses,
W. J. Hutchins,
L. C. Hutchins.

Inventor.
Edward McGovney.
By Thos. H. Hutchins.
Atty.

UNITED STATES PATENT OFFICE.

EDWARD McGOVNEY, OF MOKENA, ILLINOIS.

HORSE HAY-RAKE.

SPECIFICATION forming part of Letters Patent No. 394,198, dated December 11, 1888.

Application filed March 16, 1888. Serial No. 267,381. (No model.)

*To all whom it may concern:*

Be it known that I, EDWARD McGOVNEY, a citizen of the United States of America, residing at Mokena, in the county of Will and State of Illinois, have invented certain new and useful Improvements in Horse Hay-Rakes, of which the following is a specification, reference being had therein to the accompanying drawings.

This invention relates to certain improvements in horse hay-rakes, which improvements are fully set forth and explained in the following specification and claims, reference being had to the accompanying drawings, and to the letters and figures of reference thereon, making a part of this specification, in which—

Figure 1:
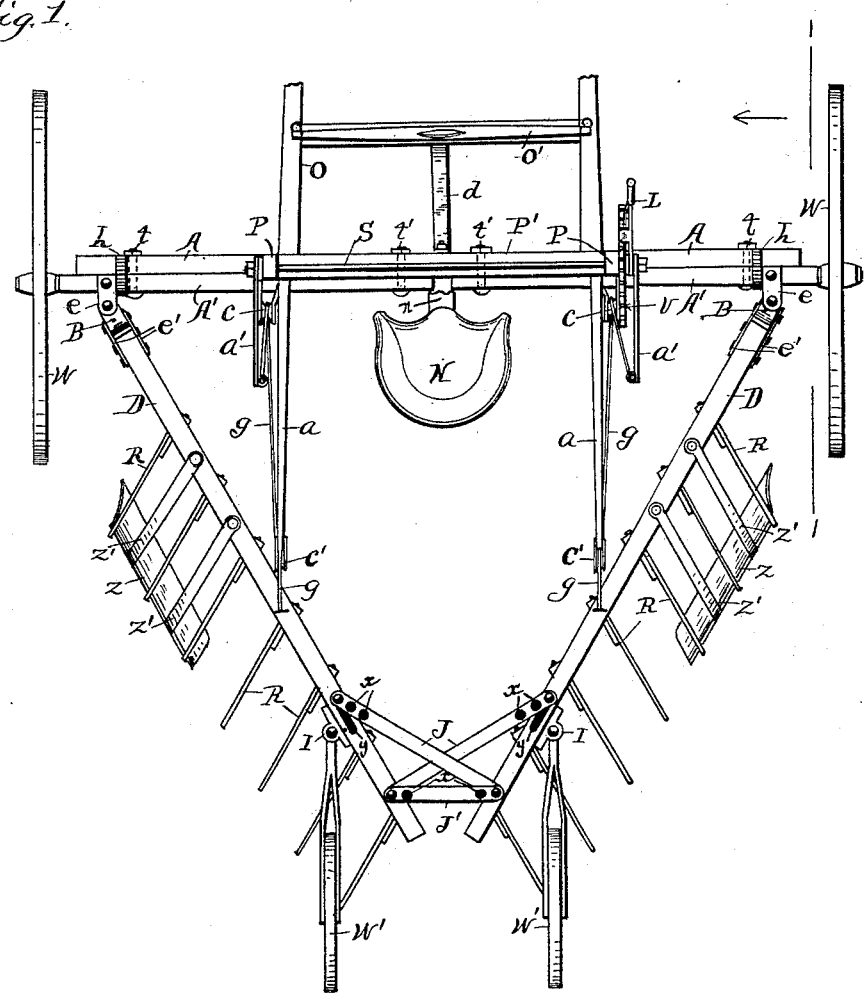
Figure 2:
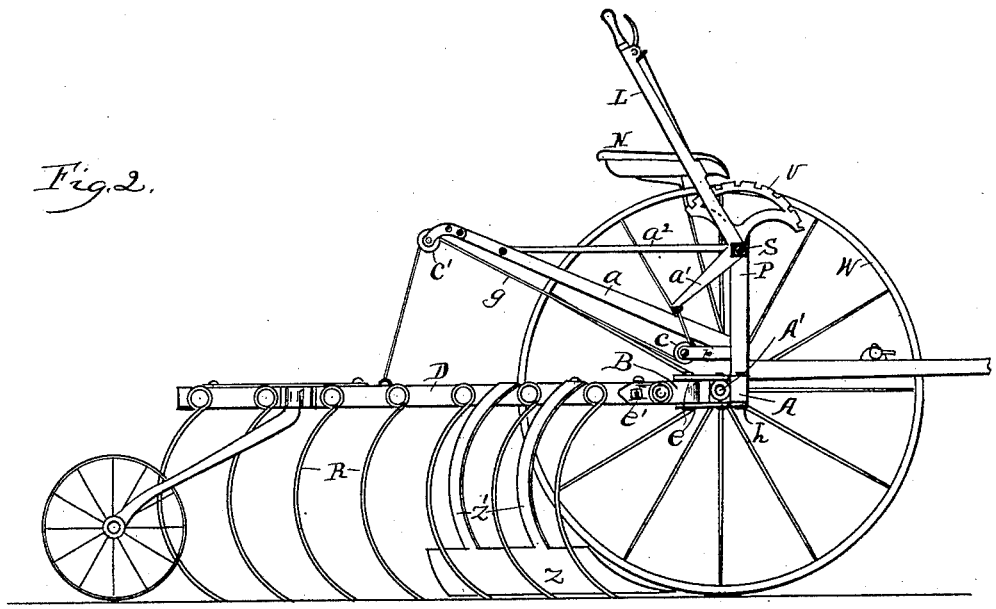
Figure 3:
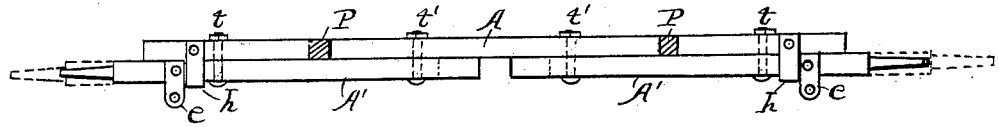

Figure 1 is a top plan view of the rake complete. Fig. 2 is a side elevation of the rake, taken on line 1 of Fig. 1, looking in the direction of the arrow; and Fig. 3 is a top plan view of its extensible axle.

This rake is intended for use in raking hay, grain, &c., in the field, and adapted to be drawn by a horse or horses, and rake and gather in the hay from each side toward the center and leave it behind the rake in the form of a windrow.

Referring to the drawings, A represents the axle proper of the machine, and has adjustably secured to it, by means of bolts $t\ t'$ and straps $h\ h$ at one side, the stub-axles A' A', on the spindles of which are placed the two traveling wheels W W.

D D are the rake-heads, respectively hinged, by means of a universal joint, B $e\ e'$, to the stub-axles A' near their respective wheels W W. The rear ends of the rake-heads converge toward each other, and are adjustably connected at that end by means of the girth J' and braces J. These braces and girth are each provided near their ends with a row of bolt-holes, X, and the rake-heads are each provided with a slot, Y, for receiving the bolts passing through said braces for the purpose of permitting lateral adjustment of the rear ends of the rake-heads.

W' W' are caster-wheels arranged to support, respectively, the rear ends of the rake-heads, and their stocks are respectively journaled in the boxes I, secured to the outer sides of the rake-heads near their rear ends.

R are spring rake-teeth secured in the ordinary manner to their respective rake-heads, and are arranged at an angle therewith acute with the rear ends of the rake-heads.

Z Z are shields secured, respectively, one to each rake-head near its forward end and in front of the teeth and a short distance above the ground, by means of arms Z' Z', having the same curvature as the rake-teeth, so that the shields may be against and supported by the rake-teeth. These shields are for the purpose of supporting the front rake-teeth and gathering up thinly-scattered and short hay and carrying it along until it increases in volume and amount, so that the teeth in the rear of said shields can control it.

P are posts framed in axle A, and one of which has secured to its upper end the notched segment V, and L is a bell-crank lever next said segment, and is provided with a hand-latch for adjustably engaging said segment.

$a\ a$ are arms having their forward ends secured to axle A and their rear extending ends provided with pulleys $c'$. The rear ends of said arms are elevated to a sufficient height, so as not to be in the way of the rake-heads when elevated.

$a^2\ a^2$ are braces connecting the outer ends of said arms with the upper part of posts P, for holding said arms $a$ in the position shown.

The posts P P are provided near their lower ends, on the side toward the rakes, with short extending arms provided with pulleys $c$ at their outer ends.

S is a rock-shaft located above and parallel with the axle, and is boxed near each end to the posts P near their upper ends. Said shaft has secured on each end an arm, $a'$, one of which is integral with and forms part of the bell-crank lever L, as shown in Fig. 2. These arms have attached to their outer ends the cords $g\ g$, which respectively pass under pulleys $c$, located one near the foot of the posts P, and over the pulleys $c'$, located at the extending ends of the arms $a$, and then attached, respectively, to the rake-heads near their outer ends. Through the medium of said cord and lever mechanism the rear ends of said rake-heads may be elevated and lowered and held where desired by means of the segment V and the hand-latch on the lever L. A brace, $d$, is used for connecting the central part of the cross-beam P', connecting said posts P with the cross-bar of the thills for bracing and giving strength to said posts.

A seat, N, is arranged on a spring-standard, n, secured on axle A for the driver to ride in, and said axle is provided with thills O and doubletree O', as shown, to which a horse may be attached to draw the rake.

In operation when the rake advances the two rakes gather the hay between them and leave it behind in the form of a windrow. The axle is made extensible, as shown, for the purpose of causing the rakes to rake over a wider or narrower space, according to the amount of hay that may lie on the ground, and accumulate about the same amount of hay in the windrow, whether the hay be light or heavy.

Having thus described my invention, what I claim as new, and desire to secure by Letters Patent, is as follows, to wit:

1. In the horse hay-rake shown and described, the combination of the axle A, the extensible stub-axles A' A', rearwardly-converging rake-heads D D, having the teeth R, caster-wheels W' W', bell-crank lever L, having a hand-latch and having the arm a', notched segment V, arms a, secured at their inner ends at or near the axle A, and their outer ends extending, respectively, about centrally above the rake-heads, and having pulleys c' at their outer ends, pulleys c, located near the inner ends of said arms a, and cords g, for connecting the rake-heads with said lever, substantially as and for the purpose set forth.

2. In the horse hay-rake shown and described, the combination of the axle A, having the extensible stub-axles A', the rearwardly converging and adjustable rake-heads D, having the rake-teeth R, caster-wheels W' W', universal joint B e e', girth J', braces J, and the hand-lever and connections for elevating and lowering the rear ends of said rakes, substantially as and for the purpose set forth.

EDWARD McGOVNEY.

Witnesses:
THOS. H. HUTCHINS,
WM. J. HUTCHINS.